United States Patent
Krejci (10) Patent No.: US 9,021,688 B2
(45) Date of Patent: May 5, 2015

(54) RIVET/BOLT INJECTION SYSTEM WITH EJECTION MECHANISM

(71) Applicant: Cosmos Krejci, Seattle, WA (US)

(72) Inventor: Cosmos Krejci, Seattle, WA (US)

(73) Assignee: Electroimpact, Inc., Mukilteo, WA (US)

( * ) Notice: Subject to any disclaimer, the term of this patent is extended or adjusted under 35 U.S.C. 154(b) by 253 days.

(21) Appl. No.: 13/729,517

(22) Filed: Dec. 28, 2012

(65) Prior Publication Data

US 2014/0182123 A1 Jul. 3, 2014

(51) Int. Cl.
*B21J 15/14* (2006.01)
*B21J 15/32* (2006.01)
*B23P 19/00* (2006.01)

(52) U.S. Cl.
CPC .......... *B21J 15/142* (2013.01); *Y10T 29/53478* (2013.01); *B23P 19/001* (2013.01); *B23P 19/004* (2013.01); *B23P 19/005* (2013.01); *B23P 19/006* (2013.01); *B21J 15/32* (2013.01)

(58) Field of Classification Search
CPC ....... B21J 15/142; B21J 15/32; B23P 19/001; B23P 19/002; B23P 19/003; B23P 19/004; B23P 19/005; B23P 19/006; B23P 19/008
See application file for complete search history.

(56) References Cited

U.S. PATENT DOCUMENTS

| | | | |
|---|---|---|---|
| 6,076,254 A * | 6/2000 | Onodera et al. | 29/714 |
| 7,954,218 B2 * | 6/2011 | Tomchick et al. | 29/243.5 |
| 2010/0244392 A1 * | 9/2010 | Ruhstaller et al. | 279/145 |

* cited by examiner

*Primary Examiner* — David Bryant
*Assistant Examiner* — Matthew P Travers
(74) *Attorney, Agent, or Firm* — Jensen & Puntigam, PS (57) ABSTRACT

A machine includes a feed system for moving fasteners to a track-type fastener injector system and a pusher for moving the fasteners along the track. A rivet ejector assembly comprises a pair of bomb bay-type doors which support a portion of the track feed system and a mechanism for recognizing misfed rivets as they approach the bomb bay doors. The bomb bay doors are rotated about their longitudinal axes so that opposing inner surfaces of the bomb bay doors pivot away from each other, along with the track portion, permitting the fastener to fall or be blown therethrough, ejected from the injector system.

9 Claims, 13 Drawing Sheets

RIVET/BOLT INJECTION SYSTEM WITH EJECTION MECHANISM

TECHNICAL FIELD

This invention relates generally to manufacturing machines for large-scale riveting and bolt injection operations, such as for commercial aircraft, and more specifically concerns a mechanism for selectively ejecting rivets/bolts from the injection system portion of the machine.

BACKGROUND OF THE INVENTION

In large-scale machines used in the manufacture of commercial aircraft, rivets or bolts (referred to hereinafter as fasteners) are fed at high speeds from a fastener feed cabinet through a feed tube to a drilling and riveting end-effector which quickly drills the required holes and then injects the fasteners into the drilled holes. Such a machine will typically include a number of individual modules for use with fasteners of various sizes. While generally such machines operate very quickly and reliably, typically up to 14 drilling and riveting operations per minute, occasionally the fasteners are misfed, such as being positioned backwards in the fastener tube or two fasteners are fed together, as two examples. In such a case, it is important to identify the incorrectly fed rivets and to very quickly eject them from the rivet injection system.

Historically, this has been done in various ways, usually with a mechanical system, or an air blast. Sometimes the injection system must be stopped and the incorrectly fed rivets removed by hand. It is important that the system for clearing rivets be fast and reliable, thus increasing overall machine reliability.

DISCLOSURE OF THE INVENTION

Accordingly, the fastener injector machine, which includes a fastener ejector assembly, comprises a mechanism for receiving fasteners from a fastener feed assembly and for moving the fasteners to a track-type injector apparatus which in operation moves the fasteners into a drilled hole in a part to be fastened; and a fastener ejector assembly which includes a pair of bomb bay-type door members supporting a portion of the track feed assembly, a mechanism for recognizing a misfed fastener as it approaches the bomb bay doors in the fastener feed system, and a system for opening the bomb bay doors, permitting the misfed fastener or fasteners to fall or be blown through the track mechanism.

BEST MODE FOR CARRYING OUT THE INVENTION

Figure 1:
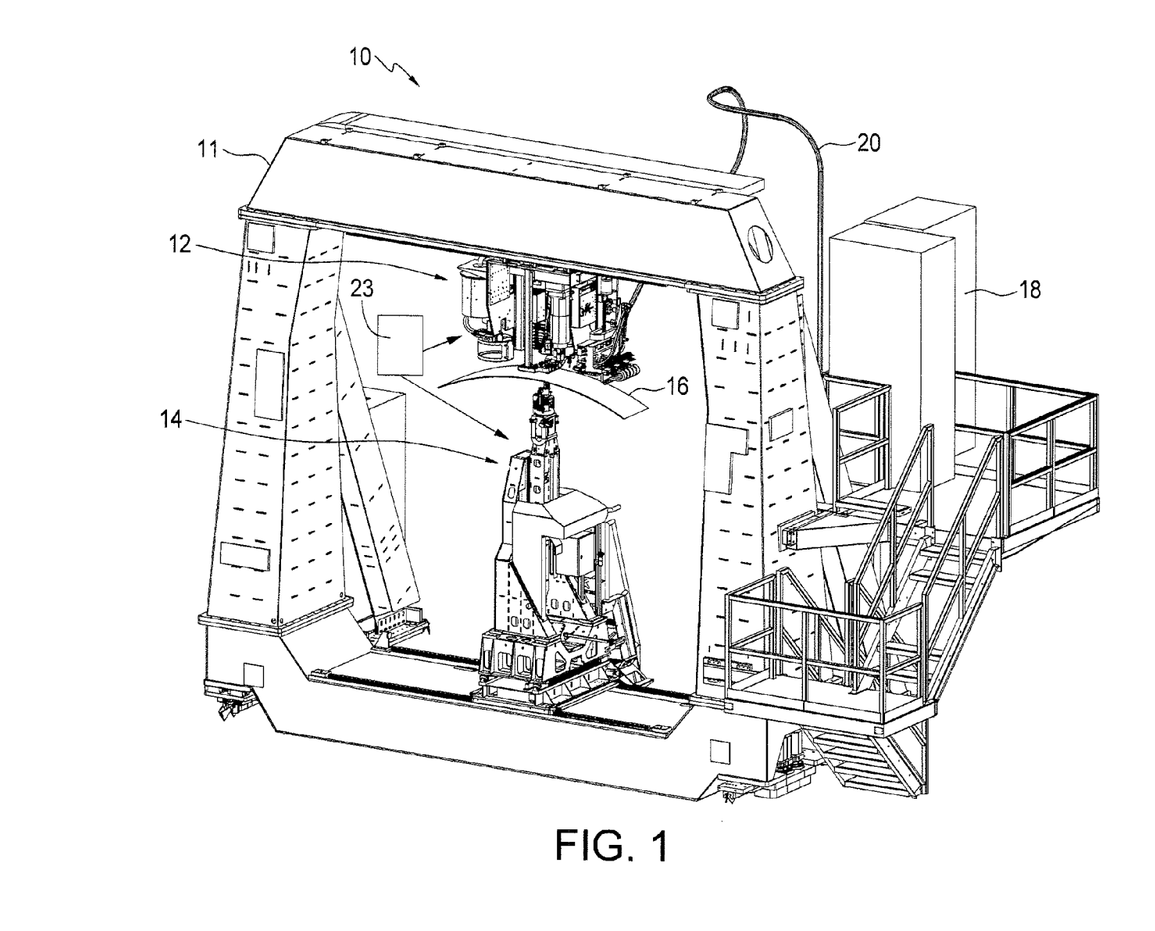
FIG. 1 is a perspective view showing a typical machine capable of large-scale manufacturing operations using fasteners, such as commercial aircraft and similar applications.
Figure 2:
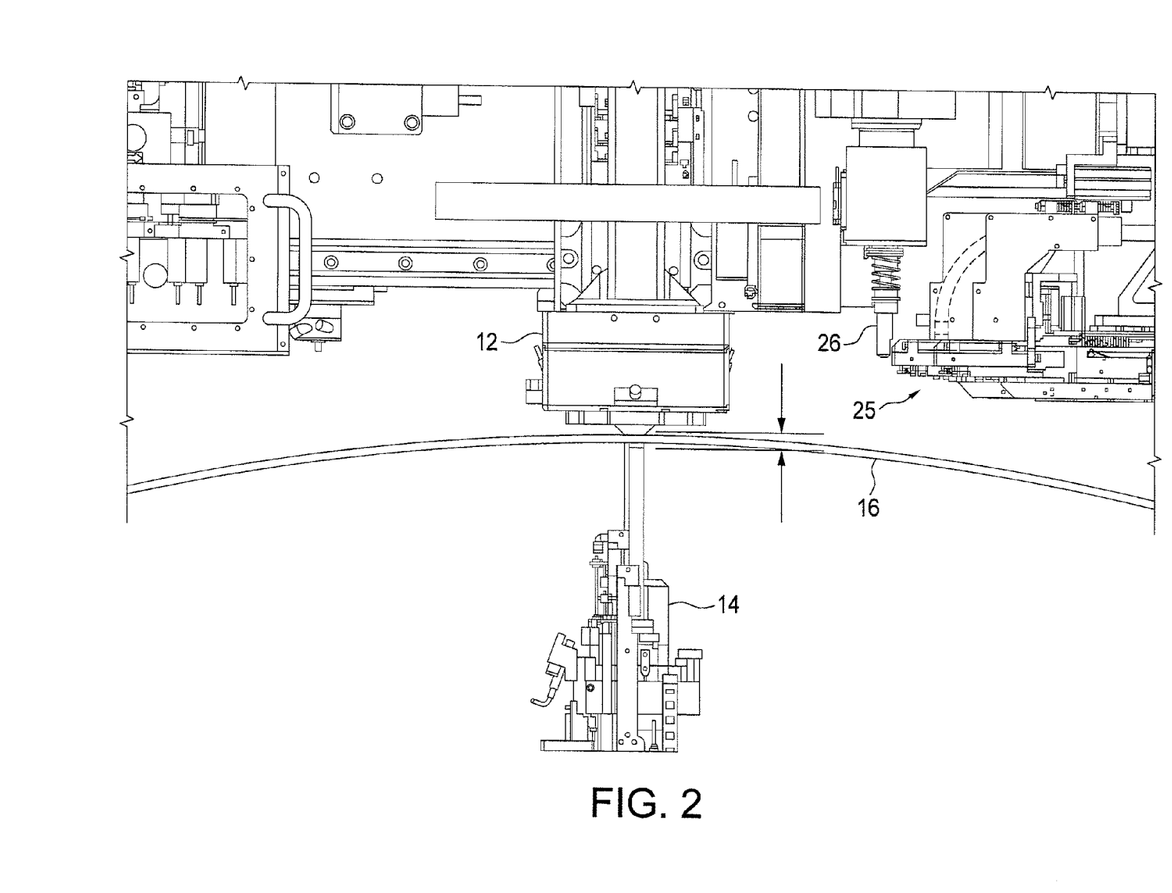
FIG. 2 is an elevational view showing a portion of the system of FIG. 1.

FIGS. 1 and 2 show a riveting machine, generally at 10. Machine 10 includes a gantry 11 with upper and lower machine function head assemblies 12 and 14. FIG. 1 also shows a workpiece 16 which is being operated on by machine clamp heads. In general, the gantry and the two machine head function assemblies move in the X and Y dimensions, while the part holding assemblies, which are not shown for clarity, move the workpiece in Z, A and B dimensions. The workpiece shown for illustration is an airframe section, although it could be other parts.

Figure 3:
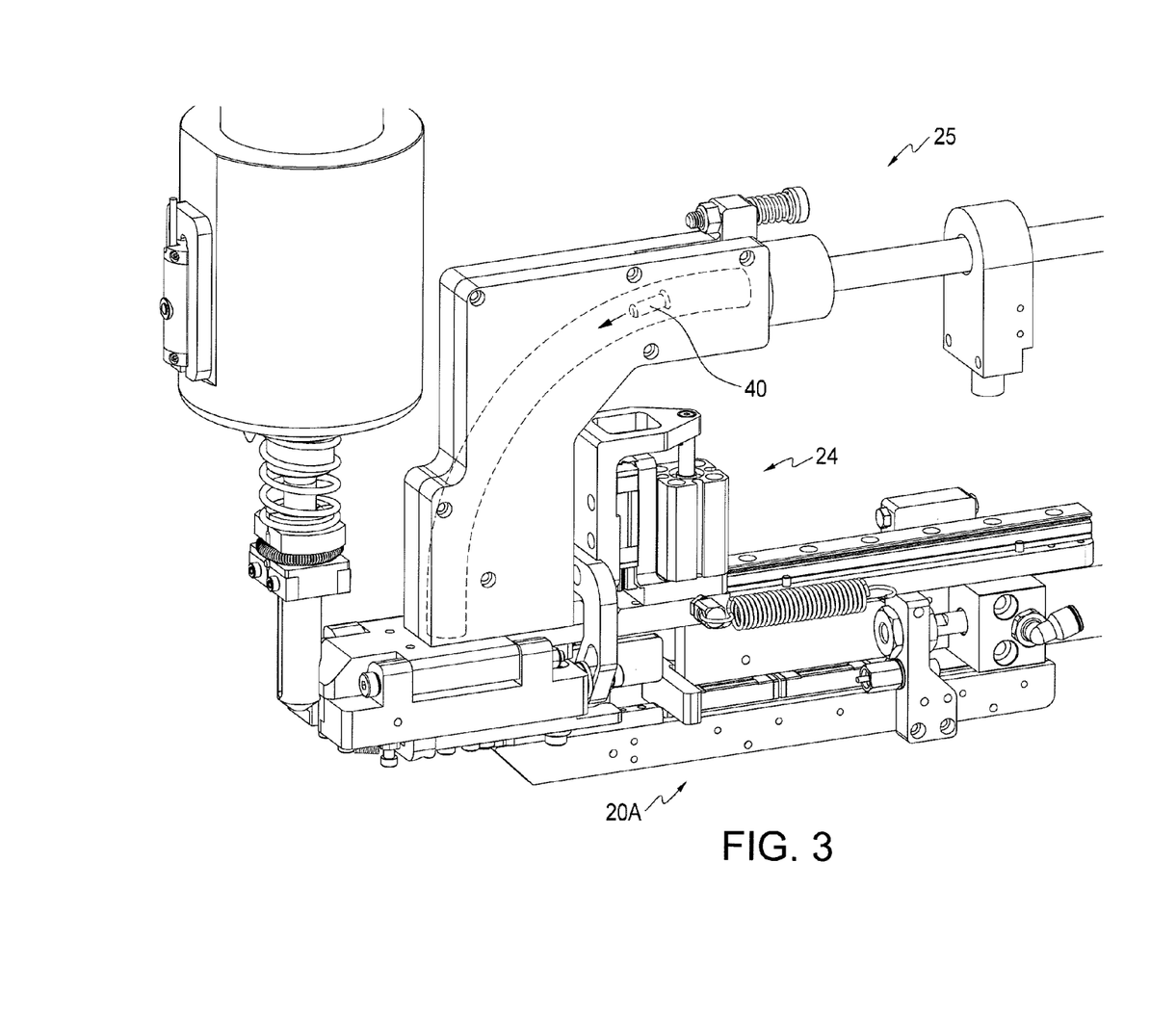
FIG. 3 is a perspective view showing a fastener-injection system with one module.
Figure 4:
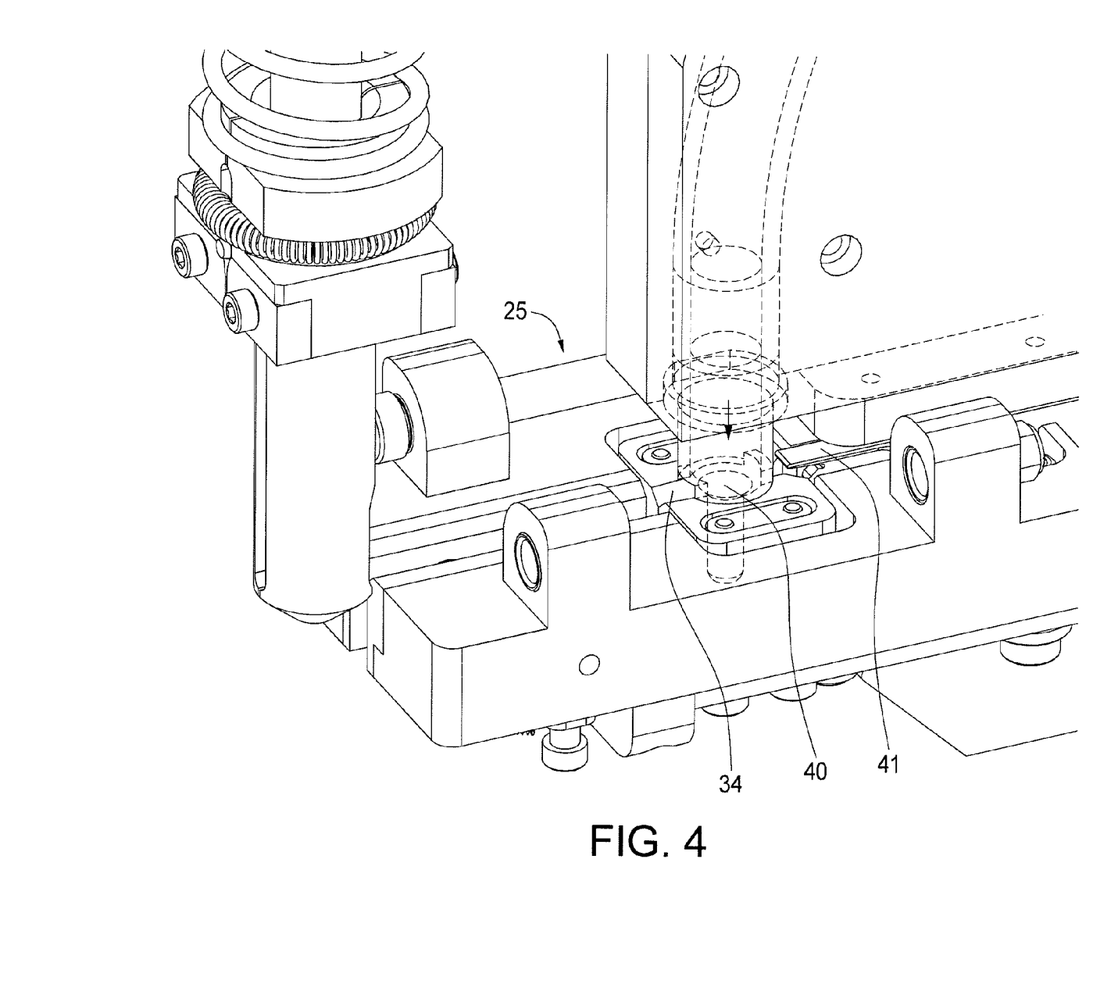
FIG. 4 is a perspective view of a portion of FIG. 3.
Figure 5A:
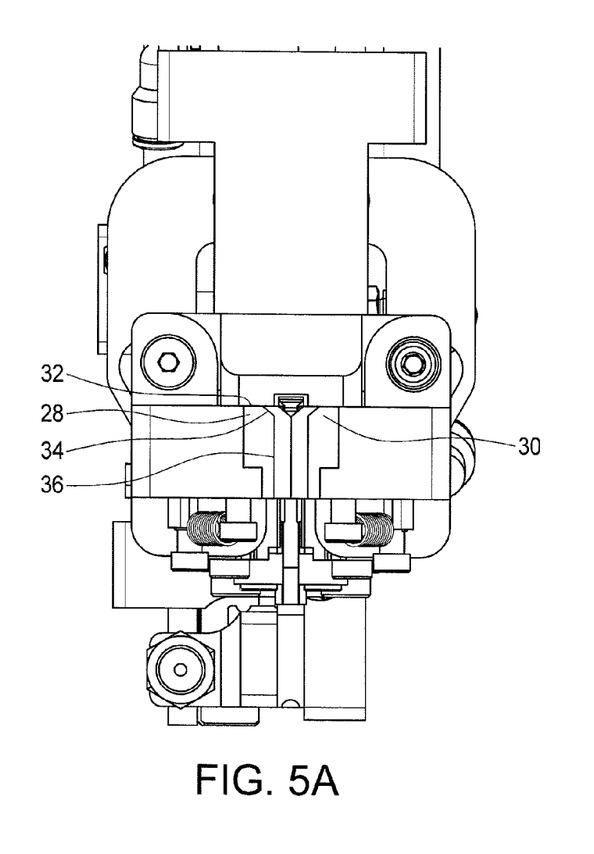
FIG. 5A is an elevational view of the system of FIG. 3, prior to insertion of a rivet.
Figure 5B:
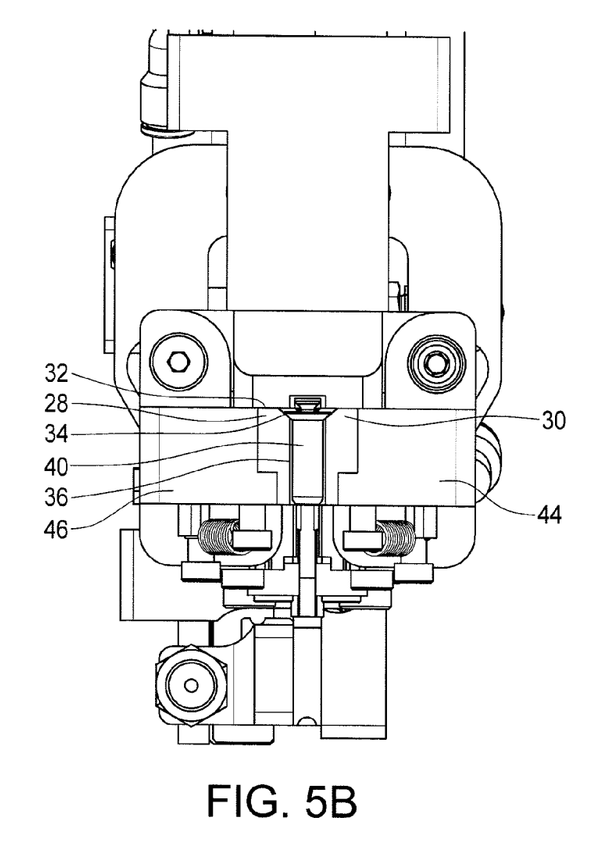
FIG. 5B is an elevational view of the system of FIG. 3, following insertion of a rivet.
Figure 5C:
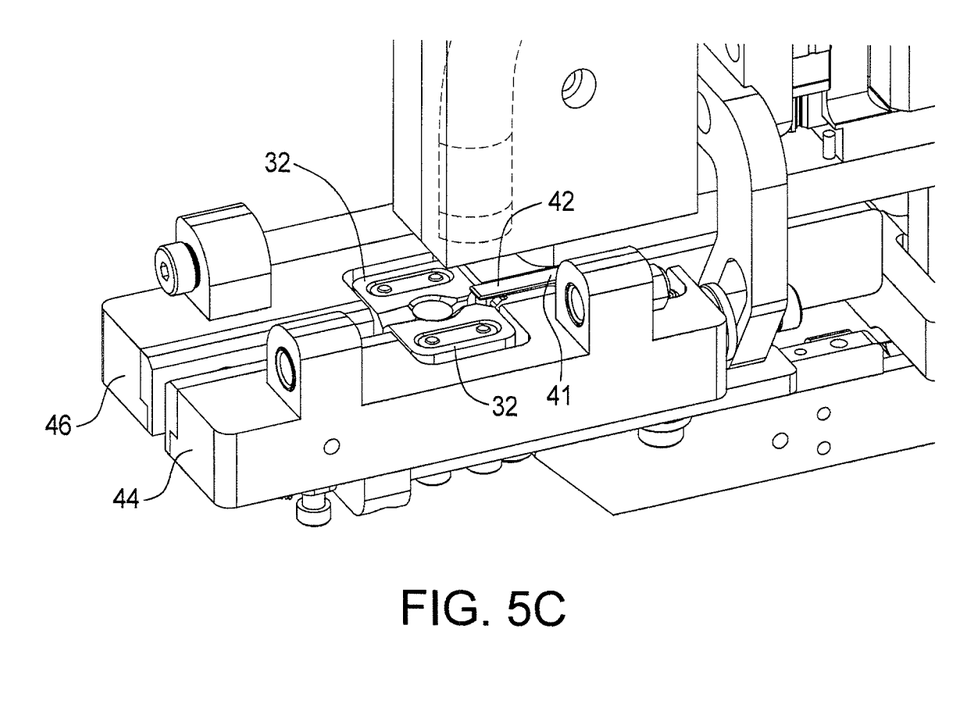
FIG. 5C is a perspective view of a portion of FIG. 3, following insertion of a rivet

Fasteners are fed from a fastener feed cabinet, shown generally at 18, through a flexible plastic tube 20 to the upper machine head assembly 12, which contains a plurality of modules which accommodate various size fasteners. In operation, machine 10 drills then fills the drilled holes with a variety of fastener types and diameters. The machine includes a number of fastener injector modules, each of which accommodates a different type of fastener, typically differing by diameter. One module is shown in FIG. 3 at 20A. Fasteners are fed from the feed cabinet at high speed by a compressed air system and move into a selected injector module after passing a fastener sensor at 21, which in one portion receives fasteners from the feed tube and transfers those fasteners to a fastener driver portion having fingers which grab the fastener, and in operation moves the fastener into the pre-drilled hole. The overall process is numerically controlled (controller generally represented at 23) with numerical control programs developed for the particular structure being riveted.

In general, the above machine is well known. FIGS. 3-6 show a fastener module, shown generally at 24, with a fastener transfer mechanism 25 and a fastener driver with fingers (not shown) at 26. The fastener transfer mechanism shown in FIGS. 3-6 is a track-style injector system. The track-style injector, shown most clearly in FIGS. 4 and 5A-5C, comprises two spaced-apart catch blocks 28 and 30, supported by two pivoting bomb bay doors which form the fastener ejection assembly of the present invention and are explained in more detail below. The catch blocks are spaced wide enough apart to allow the tail of the fastener therethrough, but not the head, such that the fastener stops in a consistent position. Each catch block has a particular configuration, shown generally in FIGS. 5A-5B. They are approximately 0.8 inches long, and include a top flat horizontal portion 32, which is approximately 0.5 inches wide, an angled intermediate section 34 approximately 0.1 inches wide, and a lower vertical section 36 which is approximately 0.5 inches high. The blocks are approximately 0.6 inches wide (high). The distance between the two lower opposing sections is wide enough to allow the tail end of the fastener therethrough, while the head of the fastener catches between the opposing intermediate sections. The fastener is thus captured by the pair of catch blocks. The fastener is positioned in the catch block by compressed air feeding through feed tube 20. The fastener is slowed down, however, as it approaches the fastener transfer portion by an air blast directed in an opposing direction in the feed tubes.

At this point, the controller pauses the operation of the machine by a timer action, which lets the fastener settle between the catch blocks. The timer begins when the tube sensor indicates the presence of a rivet moving through the feed tube. With the fastener seated (FIGS. 4 and 5A, 5B), a pusher 41 extends and engages the top and shank of the fastener, the pusher is moved forward. The pusher 41 is a blade-like member that pushes the fastener down the track assembly. The forward end of the pusher includes a cap portion 42 which fits over the fastener head and prevents the fastener from riding up in the track, as it is moved forward toward the fastener driver.

Figure 6:
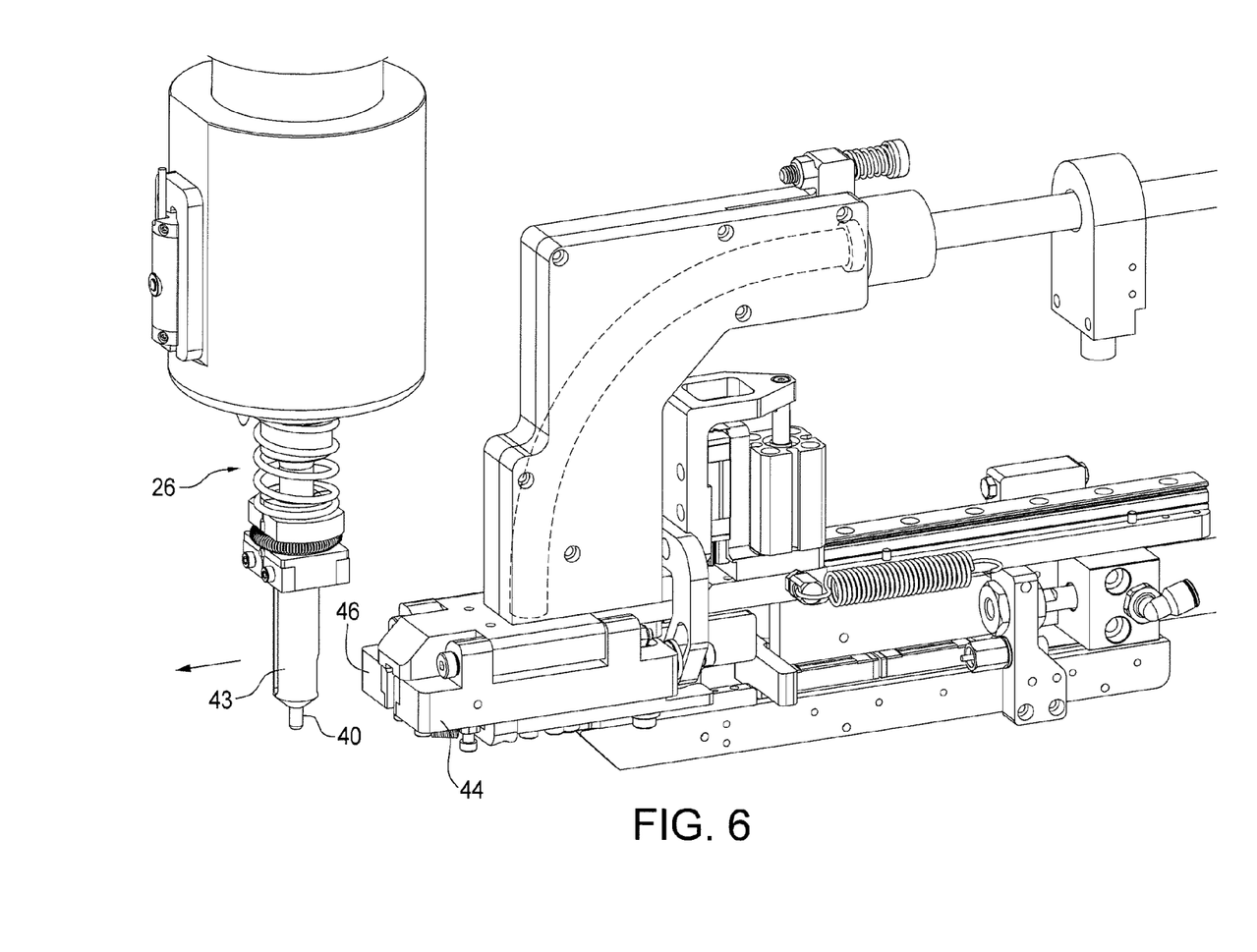
FIG. 6 is a perspective view of a fastener injection module with a fastener having been injected to a finger-type fastener inserter mechanism.

As the pusher extends, the fastener 40 is pushed beyond the two catch blocks and down the track until the fastener is moved into the fingers of the driver 43, as shown in FIG. 6. The spring-loaded fingers (not shown) positioned in the driver are forced open by the fastener being moved by the pusher and closed by spring force to hold the fastener 40 once the fastener reaches the center of the fingers. The pusher 41 now retracts, leaving the fastener in the fingers, as shown in FIG. 6. The fastener transfer portion is now back in its starting position. In the next step of the machine process, the fastener driver inserts the fastener into the drilled hole.

The rivet ejection assembly is shown in FIGS. 7-11. The ejection assembly comprises two bomb bay-like doors 44 and 46 which rotate away from each other, allowing a misfed fastener or fasteners to drop away from the injector track. Examples of misfed fasteners include multiple fasteners within the tube at the same time or a fastener positioned backwards in the feed tube. Pin slot members 48 and 50 at the rear ends of the bomb bay doors, explained in more detail below, pivot the bomb bay doors between open and closed positions. The bomb bay doors and the pin slot members are connected to function as cams and cam followers. Each bomb bay door includes a flat plate with two spaced-apart mounting elements 52, 54 extending from the upper surface thereof. The inner surfaces 55, 57 (FIG. 10) of the opposing flat plates are spaced apart and support the catch blocks therebetween. The flat plates are pivotable about fixed members 56 and 58 which extend between the two mounting elements 52, 54 of bomb bay door 44. An opening is in registry between the mounting elements and the fixed member associated with each flat plate portion of the bomb bay doors. A rod extends throughout the openings; rod 60 for bomb bay door 44 and rod 62 for bomb bay door 46, shown in FIG. 10.

Figure 7:
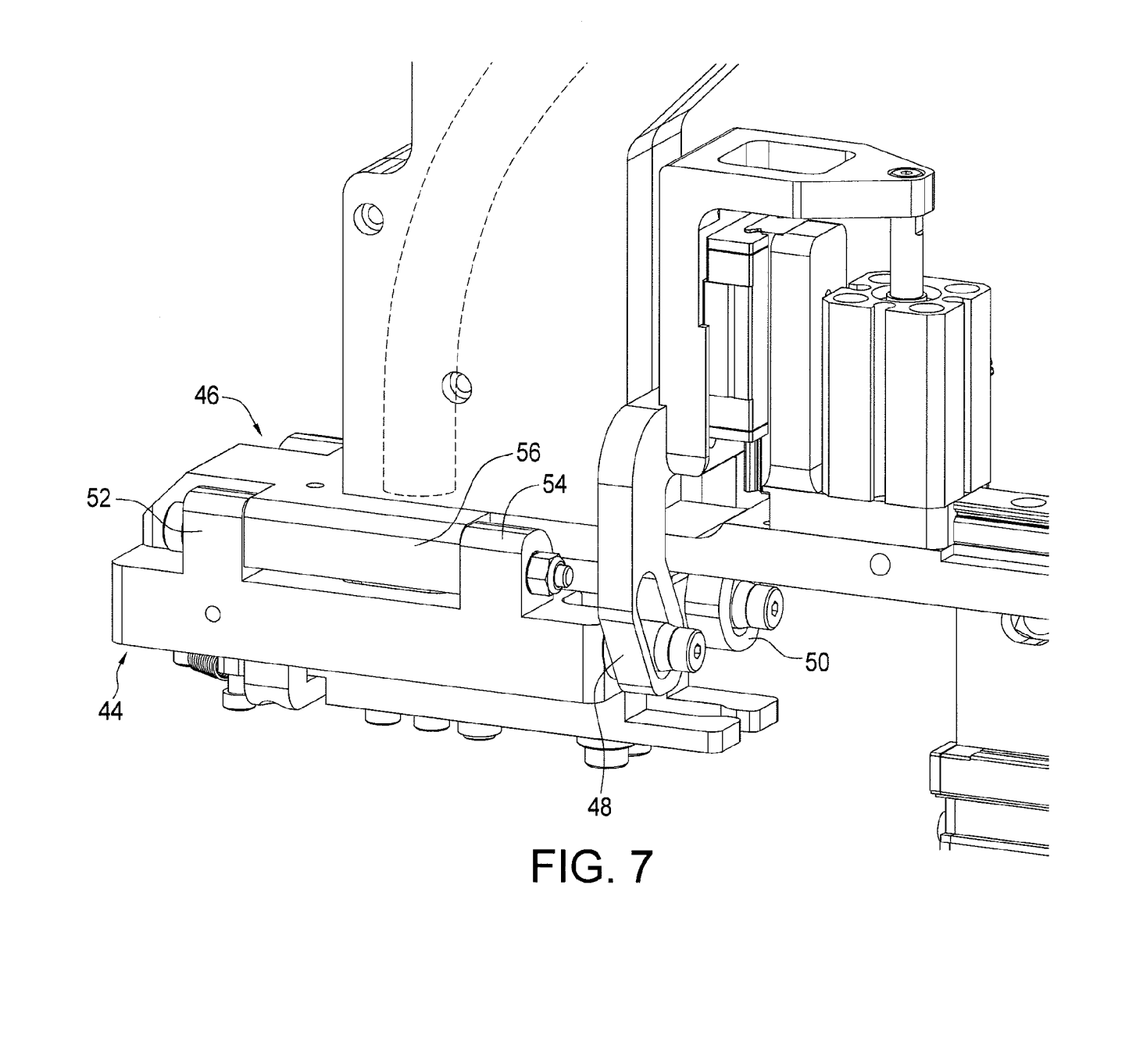
FIG. 7 is an elevational view showing the fastener ejection assembly in a closed position.
Figure 8:
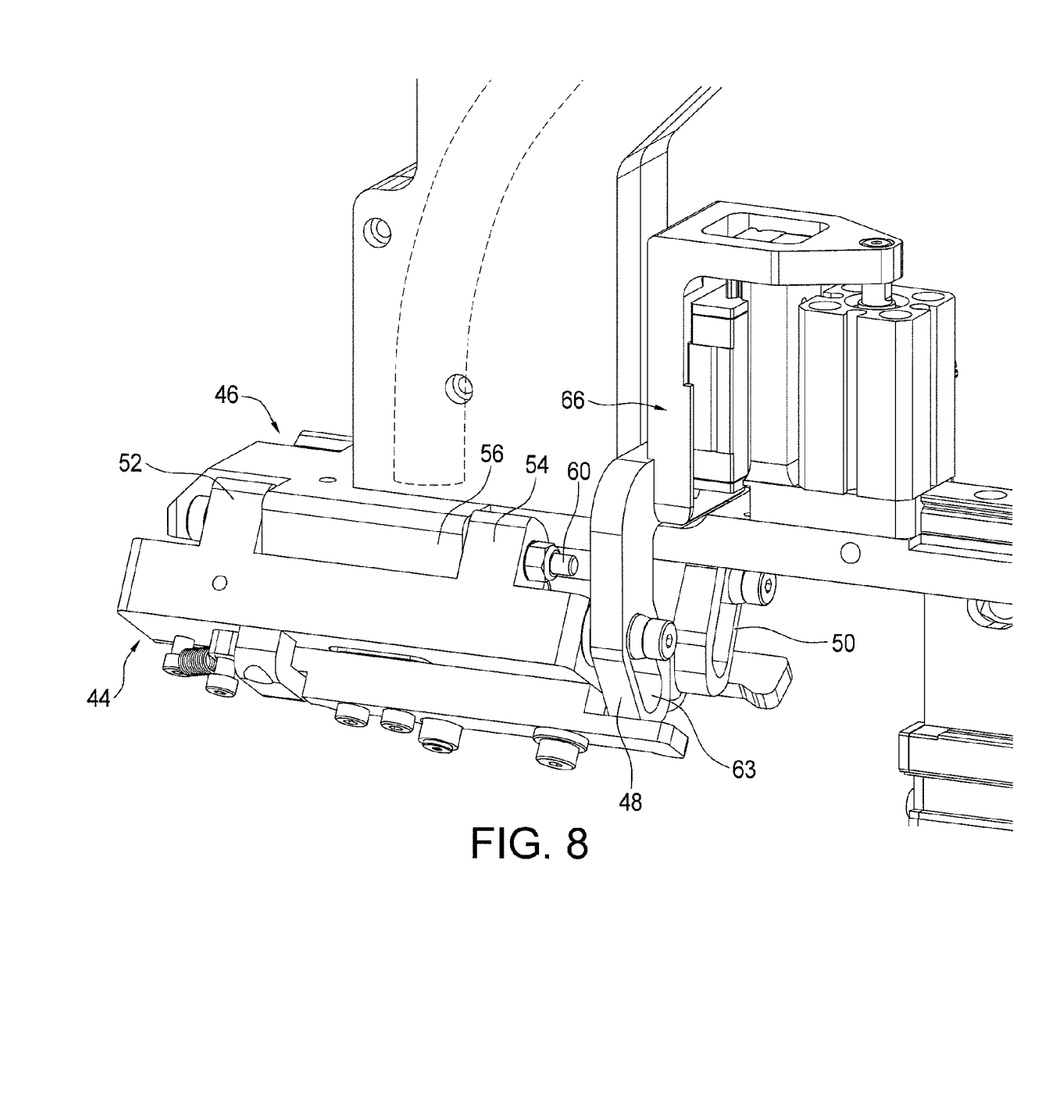
FIG. 8 is a perspective view, similar to FIG. 7, showing the ejection assembly in an open position.
Figure 9:
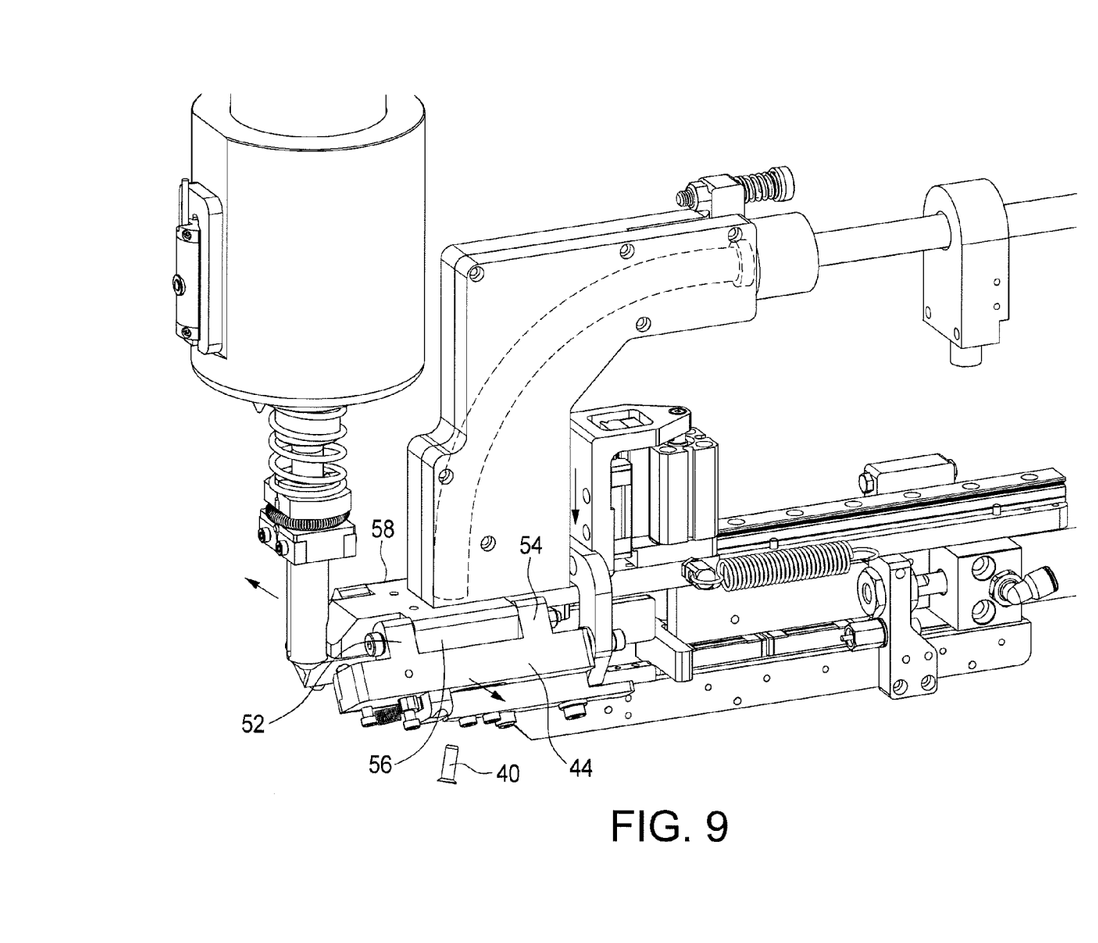
FIG. 9 is a perspective view of an injection module with the ejection assembly open, permitting an incorrectly fed fastener to fall out of the injection module.
Figure 10:
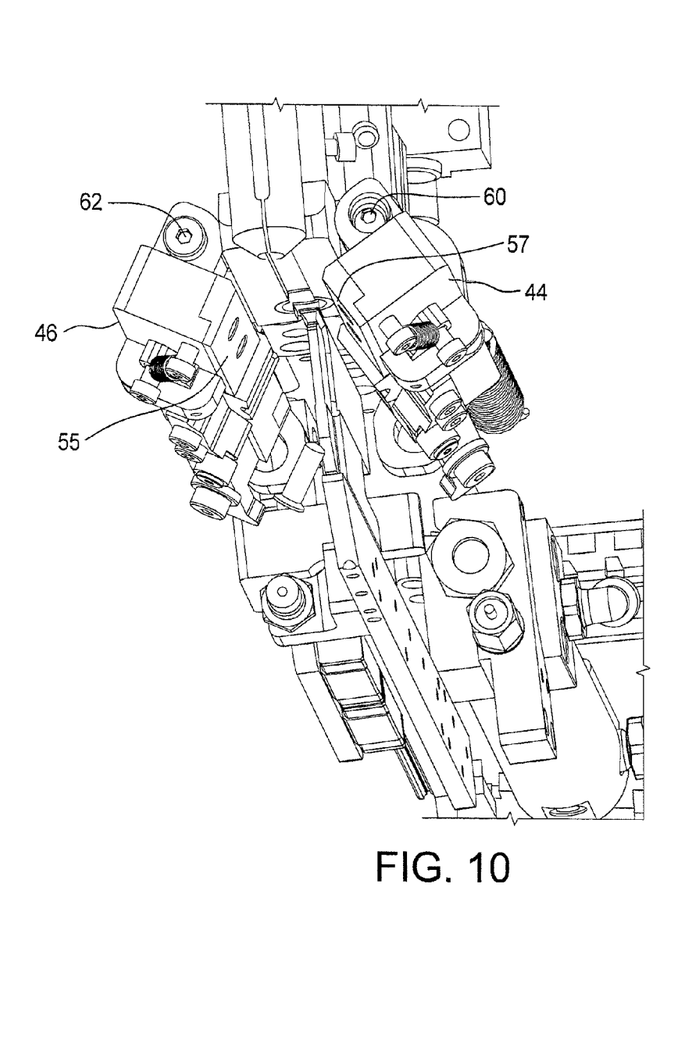
FIG. 10 is a view from beneath the rivet ejection assembly, showing the ejection assembly in an open condition, with a rivet falling therefrom.
Figure 11:
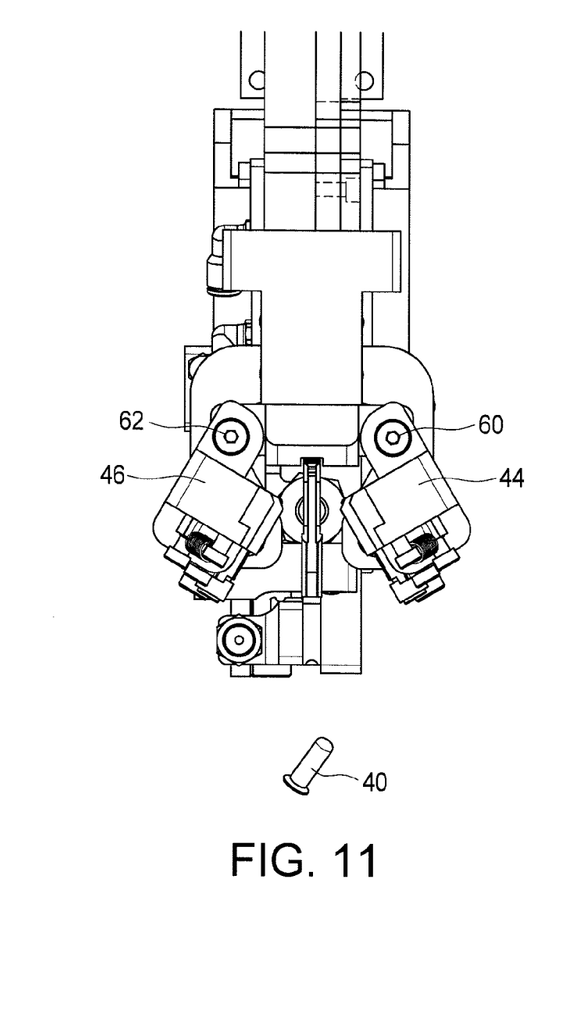
FIG. 11 is a view of the ejection assembly in an open condition, allowing a rivet to fall from the injection system.

As the flat plate members rotate about rods 60 and 62, the space between the opposing inner surfaces 55 and 57 increases and allows the fastener/fasteners therein to fall therethrough or be blown by compressed air away from the injector system. A catch bin can be positioned to catch the discarded fasteners. FIG. 7 shows the bomb bay doors in their closed position, which is the normal operating position for the injector. At the rear of each plate member is an associated pin slot member (48 for example for bomb bay door 44 and 50 for bomb bay door 46), which comprise a metal plate having a slot (63 for example) at a lower end thereof. The lower end of each pin slot angles inwardly at about 30°. The upper end of the pin slot members are attached to an actuating mechanism 66. The activating mechanism is shown extended in FIG. 7 in which the bomb bay doors are closed and retracted in FIG. 8, in which the bomb bay doors are open.

Accordingly, a fastener ejection system for use with a fastener injector track system has been disclosed. It provides a simple yet reliable arrangement for ejecting misfed fastener from a track-type fastener injection system.

Although a preferred embodiment of the invention has been disclosed for purposes of illustration, it should be understood that various changes, modifications and substitutions may be incorporated in the embodiment without departing from the spirit of the invention, which is defined by the claims which follow.

What is claimed is:

1. A fastener injector machine which includes a fastener ejector assembly, comprising:
   a mechanism for receiving fasteners from a fastener feed assembly and for moving the fasteners to a fastener transfer mechanism, which in operation moves the fastener into a drilled hole in a part to be fastened; and
   a fastener ejector assembly which includes a pair of bomb bay-type door members supporting a portion of the fastener transfer mechanism, a mechanism for recognizing a misfed fastener as it approaches the bomb bay doors in the fastener transfer mechanism, and a system for opening the bomb bay doors, permitting the misfed fastener or fasteners to fall or be blown through the fastener transfer mechanism away from the injector machine.

2. The system of claim 1, wherein the bomb bay door members are pivotable about a fixed longitudinal rod member, with the bomb bay door members including opposing inner surfaces which pivot away from each other about the respective longitudinal rod members, opening enough to permit the misfed fastener to fall therethrough.

3. The system of claim 1, including a drive mechanism for each door member which includes a connecting member having an angled slot therein into which a pin extension of the door member fits, and an actuator for moving the connecting member in such a way as to pivotally open the door members and then close them when the fastener has been ejected.

4. The system of claim 1, wherein fasteners are moved from the feed assembly to the track assembly by compressed air.

5. The system of claim 1, including a sensor for recognizing the presence of a fastener as it moves down a feed tube portion of the fastener feed assembly.

6. The system of claim 5, wherein the fastener is moved down the feed tube by feed tube compressed air and is slowed down as it approaches the fastener transfer mechanism by compressed air moving in the reverse direction to the feed tube compressed air.

7. The system of claim 1, wherein a fastener is moved along the fastener transfer mechanism by a controlled pusher member.

8. The system of claim 1, including a plurality of fastener injector modules accommodating various sized fasteners, wherein each module includes a fastener ejector assembly.

9. The system of claim 1, wherein the fasteners are rivets or bolts.

* * * * *